US009250040B1

(12) United States Patent
Bird et al.

(10) Patent No.: US 9,250,040 B1
(45) Date of Patent: Feb. 2, 2016

(54) INFRARED LIGHT MEANS FOR REMOTELY CONTROLLING DEVICES ON A ROTATING WEAPON ASSEMBLY, WITHOUT PHYSICAL CONTACT

(75) Inventors: James R. Bird, Succasunna, NJ (US); Aaron Barton, Oswego, NY (US); Michael Pottratz, Hopatcong, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 1430 days.

(21) Appl. No.: 12/984,749

(22) Filed: Jan. 5, 2011

Related U.S. Application Data

(60) Provisional application No. 61/306,048, filed on Feb. 19, 2010.

(51) Int. Cl.
*F41G 5/06* (2006.01)

(52) U.S. Cl.
CPC ........................................ *F41G 5/06* (2013.01)

(58) Field of Classification Search
CPC ........ Y10S 901/46; Y10S 901/47; F41G 5/06
USPC ................. 901/47; 700/56, 57, 59; 89/41.01, 89/41.02, 41.06, 41.15
See application file for complete search history.

(56) References Cited

U.S. PATENT DOCUMENTS

| | | | | |
|---|---|---|---|---|
| 3,097,299 A * | 7/1963 | Rasmussen | ............ | G01C 19/28 250/231.13 |
| 4,978,857 A * | 12/1990 | Juengel | ................ | B23Q 1/0009 250/551 |
| 5,171,531 A * | 12/1992 | Christianson | .... | G01N 27/44704 422/547 |
| 8,632,376 B2 * | 1/2014 | Dooley | ................... | A63F 9/143 273/246 |
| 2012/0211448 A1 * | 8/2012 | Markey | .................. | F16M 11/10 211/26 |

* cited by examiner

*Primary Examiner* — Troy Chambers
*Assistant Examiner* — John D Cooper
(74) *Attorney, Agent, or Firm* — Michael C. Sachs

(57) ABSTRACT

The invention relates to remotely controlling a number of devices on an instrument mounted on a rotating assembly without physical contact to the assembly. A series of infrared light-emitting diodes mounted in a stationary ring configuration are placed around (but not directly touching) the rotating assembly to send control signals to infrared receiver devices located on the assembly. The rotating assembly might be the turret of a conventional Common Remotely Operated Weapons Station (CROWS), the invention to replace convention internal slip-ring providing power and control to a gun on the CROWS. The infrared data links of this invention do not inhibit the movement of the rotating assembly, and further are not susceptible to radio-jamming by electronic warfare countermeasures. Additionally, the invention includes a mount that allows auxiliary devices with Picatinny Rails™ to also be attached to such a CROWS turret.

9 Claims, 4 Drawing Sheets

US 9,250,040 B1

INFRARED LIGHT MEANS FOR REMOTELY CONTROLLING DEVICES ON A ROTATING WEAPON ASSEMBLY, WITHOUT PHYSICAL CONTACT

CROSS REFERENCE TO RELATED APPLICATIONS

This application claims benefit under 35 USC 119 (e) of the filing date of Provisional Application No. 61/306,048 filed Feb. 19, 2010, the entire file contents of which are hereby incorporated by reference herein as though fully set forth.

U.S. GOVERNMENT INTEREST

The inventions described herein may be made, used, or licensed by or for the U.S. Government for U.S. Government purposes.

BACKGROUND OF INVENTION

The invention relates to remotely controlling a number of devices mounted on rotating instrument assemblies without requiring direct physical contact to such rotating assemblies. An example of such a situation is the gun on the Kongsberg Common Remotely Operated Weapons Station ("CROWS"). In past practice, one could install a slip-ring system of electrical contacts, on the rotating assembly for passing control wires. Additionally, one could also use an RF system for remote control. The former method requires physical contact between the rotating assembly and its surroundings, possibly limiting its movement, and requires the slip-ring to be placed exactly coincident with the axis of rotation. The latter method is susceptible to radio-jamming by electronic warfare countermeasures. There has therefore been a need for a means to remotely controlling a number of devices mounted on rotating instrument assemblies without physical contact and which is also not easily vulnerable to electronic warfare countermeasures.

BRIEF SUMMARY OF INVENTION

The method uses a series of infrared light-emitting diodes, mounted in a stationary ring configuration around (but not touching) the rotating assembly to send control signals to infrared receivers located on the rotating assembly. For instance, the turret of a Kongsberg Common Remotely Operated Weapons Station ("CROWS") generally depicted in FIG. 5 hereof conventionally comprises a rotating assembly. Currently, an internal slip-ring provides power and control to a gun on the CROWS. The instant invention will bypass the conventional slip-ring arrangement, instead using an infrared communications channel, while still allowing an operator to control the same devices on the turret. The infrared data link of this invention does not inhibit the movement of the rotating assembly, and it is also should not be susceptible to radio-jamming by electronic warfare countermeasures.

OBJECTS OF THE INVENTION

Accordingly, it is an object of the present invention to provide a more physically dependable means for allowing an operator to selectively control devices, such as a gun, on the rotatable turret of a CROWS system, without direct electrical or physical connection upon said CROWS system which might be susceptible to wear and misalignment errors.

Another object of the present invention is to provide a means for selectively controlling devices, such as a gun, on the turret of a CROWS system, which system is not susceptible to radio-jamming by electronic warfare countermeasures.

It is a further object of the present invention to include a Picatinny Rail mount means attached on a Kongsberg CROWS system, to attach additional devices on the CROWS as may be desired, according to this invention.

It is a yet another object of the present invention in general to provide a more physically dependable means for allowing an operator to selectively control devices on a rotatable instrument, without direct electrical or physical connection upon said rotatable instrument which might be susceptible to wear and misalignment errors.

It is a still further object of the present invention in general to provide a more physically dependable means for allowing an operator to selectively control devices on a rotatable instrument, without direct electrical or physical connection upon said rotatable instrument which might be susceptible to radio-jamming by electronic warfare countermeasures.

These and other objects, features and advantages of the invention will become more apparent in view of the within detailed descriptions of the invention, the claims, and in light of the following drawings wherein reference numerals may be reused where appropriate to indicate a correspondence between the referenced items. It should be understood that the sizes and shapes of the different components in the figures may not be in exact proportion and are shown here for visual clarity and for purposes of explanation. It is also to be understood that the specific embodiments of the present invention that have been described herein are merely illustrative of certain applications of the principles of the present invention. It should further be understood that the geometry, compositions, values, and dimensions of the components described herein can be modified within the scope of the invention and are not generally intended to be exclusive. Numerous other modifications can be made when implementing the invention for a particular environment, without departing from the spirit and scope of the invention.

DETAILED DESCRIPTION

Figure 1:
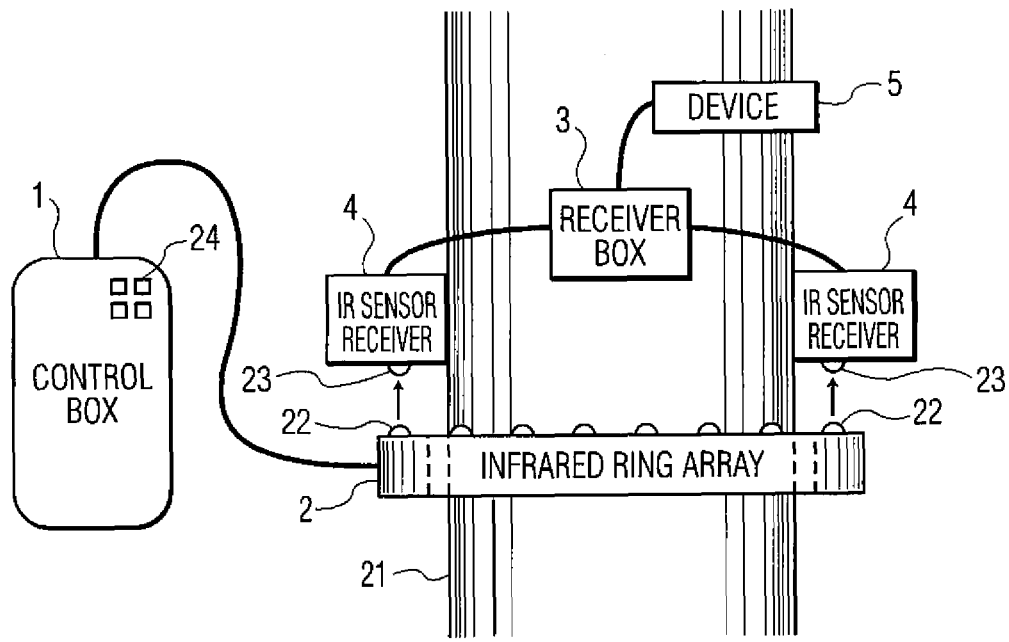
FIG. 1 depicts a system using infrared light transmission means for controlling a rotating instrument assembly according to this invention.

As shown in FIGS. 1-7, the invention includes a control box 1 (not completely shown) in FIG. 1 to toggle devices mounted on a rotating assembly (21), the control box comprising a four momentary button user interface, with one or more illuminated status lights, a power switch, and a connector for driving an external array of infrared LED's (22). Pressing a button (24) triggers the response of an internal microcontroller for determining which button was pressed, for illuminating or de-illuminating an appropriate status light by toggling a status register, for transmitting an appropriate signal through an external infrared LED array to a receiver box (3). A ring array (2) for mounting directly around the rotating assembly is included, and it has infrared LEDs (22) thereon for transmitting an infrared signal to infrared sensors (23) on IR sensor receivers (4) mounted directly on the rotating assembly. The shape of the ring array facilitates continuous controllability by an operator; at least one infrared sensor (23) should always be within line of sight of an infrared LED transmitter (22). The ring array also facilitates mounting to a stationary item surrounding the rotating assembly, such as mounting to the base of a CROWS system. A receiver section (not completely shown) has a receiver box 3 for decoding commands sent by the control box and controlling the appropriate device on the assembly, comprises two external infrared receivers, one or more illuminated status lights, a power switch, and four two-pin connectors attached to four internal reed relays, each of which act to open and close a circuit of an attached device. Responses from the infrared sensors (23) on IR sensor receivers (4) trigger the response of a microcontroller, which causes determining the validity of an incoming signal, decoding the command issued, and toggling an appropriate relay. The invention also provides for a mount that allows auxiliary devices with Picatinny Rails™ to be attached to a rotating assembly, specifically the CROWS turret (13).

Figure 2A:
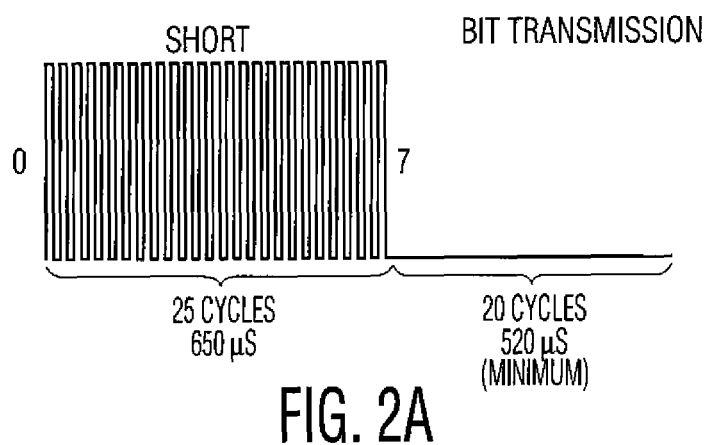
FIG. 2 shows bit transmission protocol for communication in this invention between a control box and ultimately through operation of a receiver box.
Figure 2B:
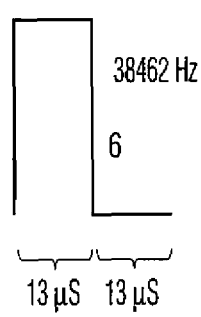
Figure 2C:
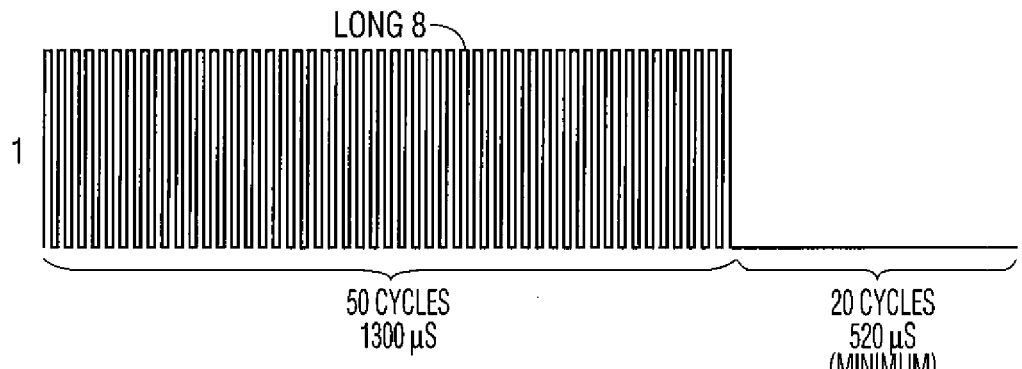
Figure 3:
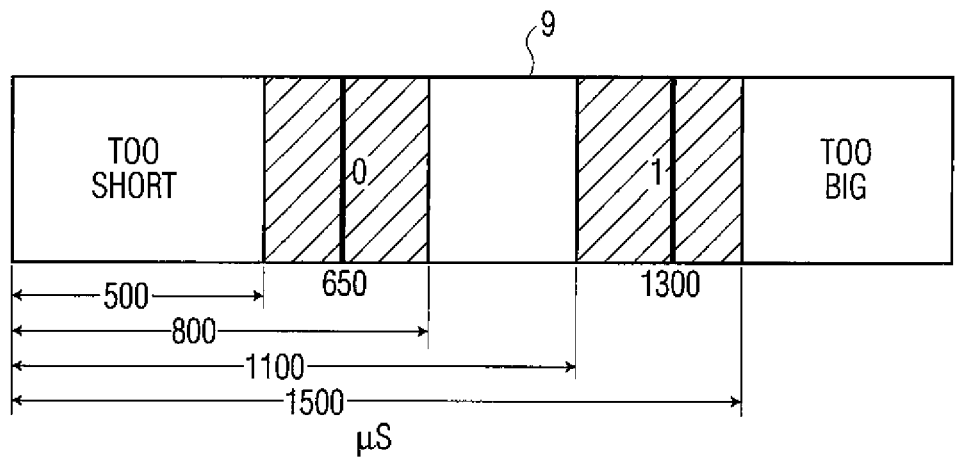
FIG. 3 shows receiver bit timing tolerances for communication in this invention between the control box and ultimately through operation of a receiver box.
Figure 4:
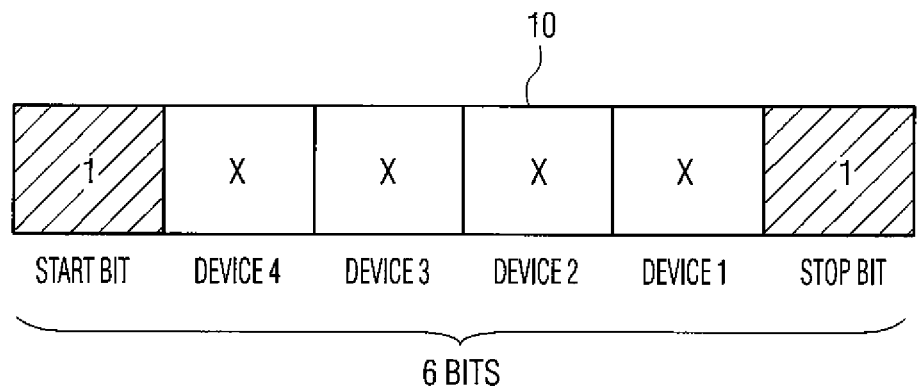
FIG. 4 shows the data frame for communication in this invention between the control box and ultimately through operation of a receiver box.
Figure 5:
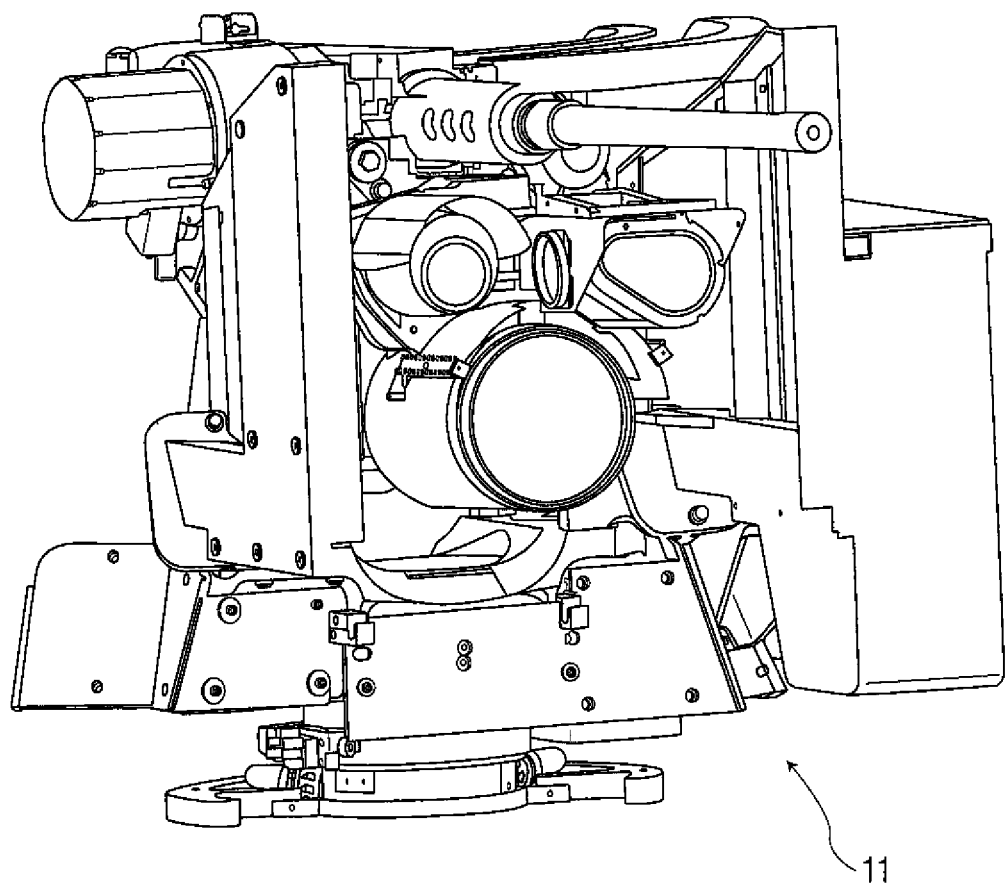
FIG. 5 shows a Kongsberg CROWS system having a stationary ring array installed according to this invention.
Figure 6:
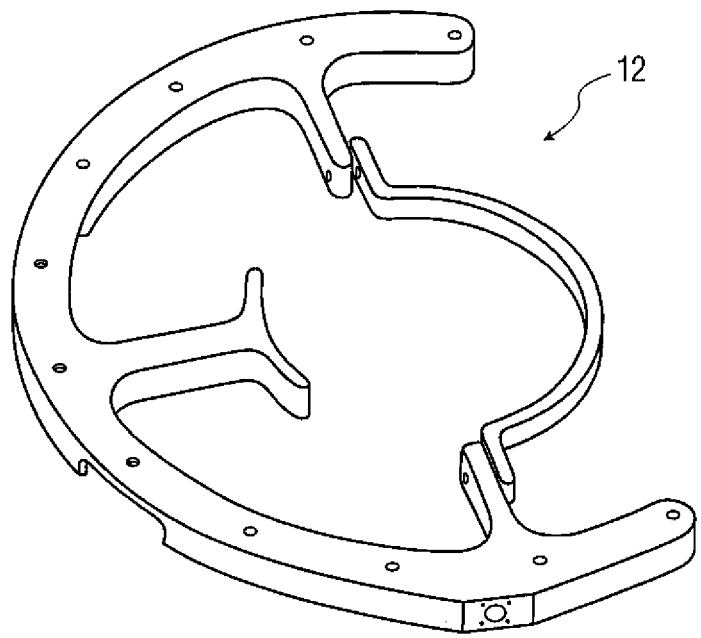
FIG. 6 shows a ring array for use around the turret of a Kongsberg CROWS system according to this invention.
Figure 7:
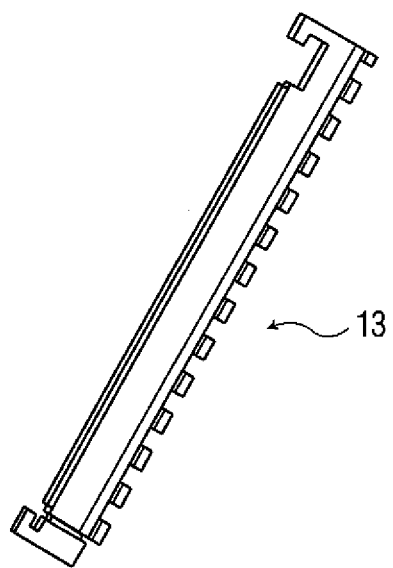
FIG. 7 shows a Picatinny Rail™ mount for use on a Kongsberg CROWS system according to this invention.

The microcontrollers in the control box and the receiver box are all like programmed in such way as to use the same command protocol. Any protocol can be used as long as it is within the capabilities of the microcontroller, the infrared transmitters, and the infrared receivers. All communication is one way only, from the control box, to the receiver box. The current protocol in use is described as follows: As shown in FIGS. 2-4, the signal as transmitted by the control box and received by the receiver box consists of a frame 6 bits long (10): a "1" start bit, four bits indicating the toggle state of the four auxiliary devices, and a "1" stop bit. A "1" bit is transmitted as a nominal 38 khz pulse carrier (6), as long (8), for a length of time of 50 cycles of the carrier on, followed by at least 20 cycles of the carrier off. A "0" bit is transmitted as a 38 khz pulse carrier (6), as short (7), for a length of time of 25 cycles of carrier on, followed by at least 20 cycles of carrier-off. By default, the receiver keeps all devices off. When a frame is received, the receiver sets the states of the relays to match the toggle state contained in the frame. If another frame is not received within a specified time-out interval, all devices are turned off again. A frame is sent as soon as possible if a button is pressed. Additionally, the control box sends a keep-alive frame (9) periodically, as long as the toggle status of any one device is "on". If they are all off, or if the power to the control box is disconnected, no frames will be sent, and the receiver box will automatically turn all devices off. There are multiple alternative ways of construction for the device: A two-way communication system can be utilized, by mounting infrared receivers alongside infrared LEDs, and vice-versa, on both the ring array and receiver boxes. The communications protocol can be any combination of pulse code modulation, pulse width modulation, and pulse spacing modulation. It can also include any error correction schemes deemed necessary. FIG. 5 shows a Kongsberg CROWS system having a stationary ring array installed according to this invention. FIG. 6 shows the ring array around the turret of a Kongsberg CROWS system according to this invention, and FIG. 7 shows a Picatinny Rail™ mount for use on a Kongsberg CROWS system according to this invention.

While the invention may have been described with reference to certain embodiments, numerous changes, alterations and modifications to the described embodiments are possible without departing from the spirit and scope of the invention as defined in the appended claims, and equivalents thereof.

What is claimed is:

1. A means of coupling control signals to selectively control various component devices in a rotatable instrument, without said means of coupling directly touching said rotatable instrument, said means of coupling comprising:

a stationary ring array surrounding, but not directly touching, said rotatable instrument such that clearance always remains between the instrument and the stationary ring array in full 360 degrees of unimpeded possible rotation of said rotatable instrument within said stationary ring array, and an array of infrared light sensor receivers mounted facing outwardly around the circumference of said instrument, and an array of infrared light emitting diodes (LED's) mounted around said stationary ring array, said LED's facing the infrared light sensor receivers mounted on said rotatable instrument, and wherein said array of infrared light emitting diodes are functioned by selecting buttons at a control box, each button powers a respective light emitting diode, and wherein, broadcast signals of infrared light may be transmitted from said array of infrared light emitting diodes to said array of infrared light sensor receivers, and wherein said array of infrared light sensor receivers can produce a set of electrical output signals in response to said such infrared light broadcast signals, and wherein said electrical output signals are configured to electrically feed into a receiver box mounted on said rotatable instrument, and wherein, in response to said electrical output signals, said receiver box can feed control signals to various component devices of said rotatable instrument, said control signals configured to then cause selective operation of the various component devices in said rotatable instrument;

wherein said rotatable instrument is a CROWS turret.

2. The means of coupling of claim 1, wherein said control box also includes one or more illuminated status lights, a power switch, and configured such that pressing a button triggers the response of a control box microcontroller which determines the button pressed, illuminating or de-illuminating the appropriate status light in response thereto by toggling a status register, thereby feeding a connector for driving the infrared LED's for transmitting a desired signal to the infrared light sensor receivers.

3. The means of coupling of claim 1, wherein said receiver box has one or more illuminated status lights, a power switch, four two-pin connectors attached to four internal reed relays, and has a receiver box microcontroller configured to determine the validity of an incoming signal, decode the command issued, and toggle a respective internal reed relay causing selective operation of a respective component device in said rotatable instrument.

4. The means of coupling of claim 1 wherein said CROWS turret includes a mount that allows auxiliary devices with picatinny rails to be attached thereto.

5. The means of coupling of claim 1, wherein a two-way communication system can be utilized, by mounting infrared receivers alongside infrared LEDs, and vice-versa, on both the stationary ring array and receiver box.

6. The means of coupling of claim 5, wherein communications include a pulse code modulation protocol.

7. The means of coupling of claim 5, wherein communications include a pulse width modulation protocol.

8. The means of coupling of claim 5, wherein communications include a pulse spacing modulation protocol.

9. The means of coupling of claim 5, wherein communications include a combination of pulse code modulation, pulse width modulation and pulse spacing modulation protocol.

\* \* \* \* \*